United States Patent
Fujinuma

[19]

[11] Patent Number: 6,120,412
[45] Date of Patent: Sep. 19, 2000

[54] OPERATION APPARATUS FOR AN AUTOMATIC TRANSMISSION

[75] Inventor: Takao Fujinuma, Tokyo, Japan

[73] Assignee: Niles Parts Co., Ltd., Tokyo, Japan

[21] Appl. No.: 09/384,416

[22] Filed: Aug. 27, 1999

[51] Int. Cl.[7] .................................................. F16H 59/04
[52] U.S. Cl. .................... 477/99; 74/473.18; 74/473.31
[58] Field of Search ....................... 477/99; 74/473.18, 74/473.12, 473.31

[56] References Cited

U.S. PATENT DOCUMENTS 5,902,209 5/1999 Moody ........................................ 477/99

FOREIGN PATENT DOCUMENTS

5-33432 4/1993 Japan ............................... H01H 25/04
2584279 8/1998 Japan ................................ F16H 59/02

*Primary Examiner*—Dirk Wright
*Attorney, Agent, or Firm*—Ronald P. Kananen; Rader, Fishman & Grauer

[57] ABSTRACT

An operation apparatus for an automatic transmission is provided for vehicles of the A/T type, in which the automatic transmission is electrically controllable using a shift lever having a single knob and a detent for each driving position. The operation apparatus has an A/T switch for transmitting electric signals corresponding to desirable driving positions to the transmission side by operating a shaft lever swingably. The operation apparatus also has an electrically driven actuator for removing a contact pin from a contact slit provided on the detent plate to inhibit movement of the shift lever upon a predetermined condition of the automobile.

25 Claims, 8 Drawing Sheets

OPERATION APPARATUS FOR AN AUTOMATIC TRANSMISSION

BACKGROUND OF THE INVENTION

1. Field of the Invention

The present invention relates generally to an operation apparatus for an automatic transmission. In particular, the present invention relates to an operation apparatus to be used with a shift lever for effecting a shifting operation between a plurality of driving positions, such as run, stop, park and the like, in A/T (Automatic Transmission) type vehicles.

2. Description of the Related Art

Some conventional vehicles, such as automobiles of the A/T type, have a shift lever position side in which a shift lever for selecting a desired driving position out of several driving positions is connected through a wire to a transmission position side. The automatic transmission is operated by driving the shift lever swingably. The swingable operation of the shift lever at the shift lever position side is transmitted to the transmission position side through the wire.

A conventional detent mechanism for the shift lever includes a contact pin for inhibiting the movement of the shift lever, as shown in Japanese Utility Model Registration No. 2584279. The contact pin is contacted with and removed from a contact slit mounted on a detent plate. The shift lever used with this conventional detent mechanism is referred by as a two-knob type shift lever because a detent knob for operating the detent mechanism is mounted on a shift knob of the shift lever.

Another conventional operation apparatus for an automatic transmission is disclosed, for example, in Japanese Utility Model Publication Laid-Open No. 5-33432. This conventional operation apparatus is provided with many switches, each of which is operated for each range position.

As mentioned above, however, the conventional A/T type vehicle has the shift lever position side connected usually through a wire to the transmission position side. Therefore, there has been a problem that deviations in the transmission of swingable operation force due to the shift lever are undesirably generated between both position sides because of slack off and distortion of the wire. Furthermore, it is necessary to secure the space required for the wiring between both position sides, and the manufacturing cost of the wiring may be increased.

Moreover, the conventional detent mechanism for shifting the shift lever to a desired driving position, as shown in Japanese Utility Model Registration No. 2584279, requires a shift lever of the two-knob type, as mentioned above. Such two-knob type shift levers have a detent knob additionally mounted on a shift knob. Therefore, the operation of the shift lever becomes more complex.

Moreover, the conventional operation apparatus of an automatic transmission, as shown in Japanese Utility Model Publication Laid-Open No. 5-33432 mentioned above, has switches operating at each of a range of positions, respectively. Therefore, there is not provided any function for inhibiting error operations in spite of the necessity of different two-directional operations.

SUMMARY OF THE INVENTION

An object of the present invention is to provide an operation apparatus for an automatic transmission that solves the problems associated with the conventional apparatus described above.

It is a further object of the present invention to provide an operation apparatus for an automatic transmission that is especially suitable for a shift lever for controlling vehicles of the A/T type.

More specifically, it is an object of the present invention to provide an operation apparatus in which a shift lever is provided with an A/T switch operated by a swing operation of the shift lever for transmitting electric signals corresponding to desirable driving positions to the transmission side. The shift lever is also provided with an actuator of the electrically driven type for removing the contact pin from the contact slit of the detent plate.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, an operation apparatus for an automatic transmission is provided with an A/T switch operated by the swing operation of a shift lever for transmitting electric signals corresponding to desirable driving positions to the transmission side. The operation apparatus includes an actuator of the electrically driven type for removing a contact pin for inhibiting movement of the shift lever from the contact slit of the detent plate.

The actuator of the operation apparatus is composed of a solenoid operated by an electromagnetic force or an electric motor. The actuator is composed of a link mechanism disposed between the actuator and the contact pin, one end of the link mechanism being coupled with the contact pin and the other end thereof being coupled with the actuator. The actuator also has a spring for resiliently urging the contact pin to the contact slit on the detent plate.

The actuator is operated by the electric signals from a key switch, a stop lamp switch, a vehicle speed sensor, and an engine rotation speed sensor. Running ranges of an automatic transmission are electrically controlled to be changed on the basis of the shifting operations due to a shift lever disposed on a steering column section. The shift lever is composed in such a manner that a movable body mounted at a base end section is pivoted by a second shaft mounted within a through hole configured to allow the shift lever to be swingable. The shift lever is thus swingable around the second shaft in the vertical direction, and is swingable around a first shaft mounted on the movable body in the front-rear direction.

The shift lever is provided with an A/T switch mounted at the upper portion of the base end section for being operated when the shift lever is on an auto mode position, and a manual switch mounted at the lower portion of the base end section for being operated when the shift lever is on a manual mode position. The shift lever is provided with a first movable contact piece mounted on the upper surface of the base end section for being contacted with a fixed contact of the A/T switch upon the auto mode position. The shift lever is also provided with a second movable contact piece mounted on the lower surface of the base end section for being contacted with a fixed contact of the manual switch upon the manual mode position.

The shift lever is provided with a contact slit mounted at the upper surface of the base end section which is contacted with a contact pin for inhibiting the movement of the shift lever in the auto mode position. The contact pin is removed from the contact slit through an actuator of the electrically driven type.

The actuator is coupled with the contact pin through a link mechanism composed of a link or the like, the link mechanism being provided between the actuator and the contact pin. The link is provided with an interlocking section coupled with the contact pin at one end of the link and above the contact slit of the shift lever, and an interlocking section at the other end is disposed above the actuator. The link is disposed so as to be swingable within a receiving space provided in the inner, upper surface side of a case.

The contact pin supports the shift lever at each of a plurality of ranges in an auto mode position by contacting the contact pin with the contact slit mounted at the base end section of the shift lever and a notch slit formed on the side surface of the base end section.

The notch slit supports the shift lever at the P range by contacting the contact pin. The contact slit is formed with an r position for supporting the shift lever at the R range, an n position for supporting the shift lever at the N range, a d position for supporting the shift lever at the D range, and an m position for supporting the shift lever to be movable from the D range to a manual mode position.

The shift lever is formed with a contact projection formed on the lower surface of the base end section, which is adapted to be contacted with an operation range limiting hole when the shift lever has moved swingably to the manual mode position. The operation range limiting hole has an approximate arc shape. One end of the arc shape corresponds to an acceleration change position at which the contact projection is located when the shift lever has swingably moved from the neutral position of the manual mode position in the plus direction, and the other end of the arc shape corresponds to a deceleration change position at which the contact projection is located when the shift lever has swingably moved from the neutral position of the manual mode position in the minus direction.

The operation range limiting hole is composed of a continuously formed cylindrical section for protecting the contact projection projected from the lower peripheral portion of the case. The shift lever has a first click body disposed at the end of the shift lever, the movable body has a second click body disposed at the end of the movable body to be pressed to a second click slit, and the first click body is pressed with pressure to a first click slit for supporting the shift lever to each range when the shift lever is located in an auto mode position. The shift lever has a second click slit for automatically restoring the shift lever to the neutral position from a plus position and a minus position of the manual mode position when the shaft lever is located in a manual mode position.

According to another broad aspect of the present invention, the running ranges of an automatic transmission are electrically controlled by an operation apparatus to be changed on the basis of the shifting operations due to a shift lever disposed on a steering column section. The shift lever is composed in such a manner that a movable body mounted at a base end section is pivoted by a second shaft mounted within a through hole which is configured to allow the shift lever to be swingable. Thus, the shift lever is swingable around the second shaft in the vertical direction, and is swingable around a first shaft mounted on the movable body in the front-rear direction. Further, the first shaft of the movable body pivotably supports a first movable plate having a contact section contacted with a first operation rod of an A/T switch, and a second movable plate having a contact section contacted with an operation rod of a manual switch.

The first movable plate is formed with an operation section contacted when the shift lever has swingably moved to an auto mode position at the lower surface thereof. The second movable plate is formed with an operation section contacted when the shift lever has swingably moved to the manual mode position at the upper surface thereof.

The operation section is contacted with a stopper formed at the inner wall of a case when the shift lever has swingably moved into the auto mode position, thereby limiting the operation range of the shift lever. The operation section is contacted with a stopper formed at the inner wall of the case when the shift lever has swingably moved in the manual mode position, thereby limiting the operation range of the shift lever. The case is formed with a second notch slit and a third notch slit on the inner wall thereof. The shift lever is formed with the first notch slit within the through hole. The movable body is provided with a first notch body pressed with pressure to the first notch slit at its end. The first movable plate is provided with a second notch body pressed with pressure to the second slit at its end. The second movable plate is provided with a third notch body pressed with pressure to the third notch slit at its end.

The first notch body is pressed with pressure to the first notch slit for supporting the shift lever when the shift lever has swingably moved to the auto mode position and the manual mode position. The second notch body is pressed with pressure to the second notch slit for supporting the shift lever to each range when the shift lever has swingably moved to an auto mode position. Further, the third notch body is pressed with pressure to the third notch slit for automatically restoring the shift lever to a neutral position from a plus position or a minus position when the shift lever is located in a manual mode position.

The shift lever is provided with a contact slit contacted with a contact pin for inhibiting the movement of the shift lever in an auto mode position at the upper surface of the first movable plate. Further the contact pin may be removed from the contact slit by an actuator composed of a solenoid or an electric motor. The actuator is composed of a plunger one end of which is coupled to a link and the other end of which is provided with a switch for interlocking the link.

The contact pin is mounted on the first movable plate. Further, the shift lever is supported at a P range in the auto mode position of the shift lever by the shift lever contacting with the contact slit for supporting the shift lever at an R range and the side surface of the first movable plate.

In summary, the operation apparatus for an automatic transmission of the present invention has a shift lever mounted on, for example, a steering column, and an A/T switch operated by the swing operation of the shift lever. The A/T switch transmits electric signals corresponding to desirable driving positions to the transmission side and is mounted on the column section. The operation apparatus also has an electrically driven actuator for removing the contact pin for inhibiting the movement of the shift lever from the contact slit.

Therefore, in the case where the operation apparatus is connected to the shift lever for controlling vehicles, such as automobiles of the A/T type, it is not necessary to use the conventional wire for connecting between a shift lever position side provided with the shift lever and a transmission position side. Therefore, reliable operation of the automatic transmission of an engine is effected by an electrical control using electric signals by transmitting electric signals corresponding to the desired driving positions by the swing operation of the shift lever toward the transmission side, through the A/T switch mounted on one side surface of the shift lever.

Moreover, a so-called detent mechanism for the shift lever is composed of an actuator of the electrically driven type operated by the electric signals from a key switch, a stop lamp switch, a vehicle speed sensor, an engine rotation speed sensor, and the like. The detent mechanism is operated to remove the contact pin for inhibiting the movement of the shift lever from the contact slit. Therefore, a detent function is effected at the desired driving positions by utilizing the shift lever having a single shift knob, without utilizing any detent knob for operating the so-called detent mechanism.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

An operation apparatus according to a first embodiment of the present invention will now be described in detail with reference to FIGS. 1 to 8 of the accompanying drawings.

Figure 1:
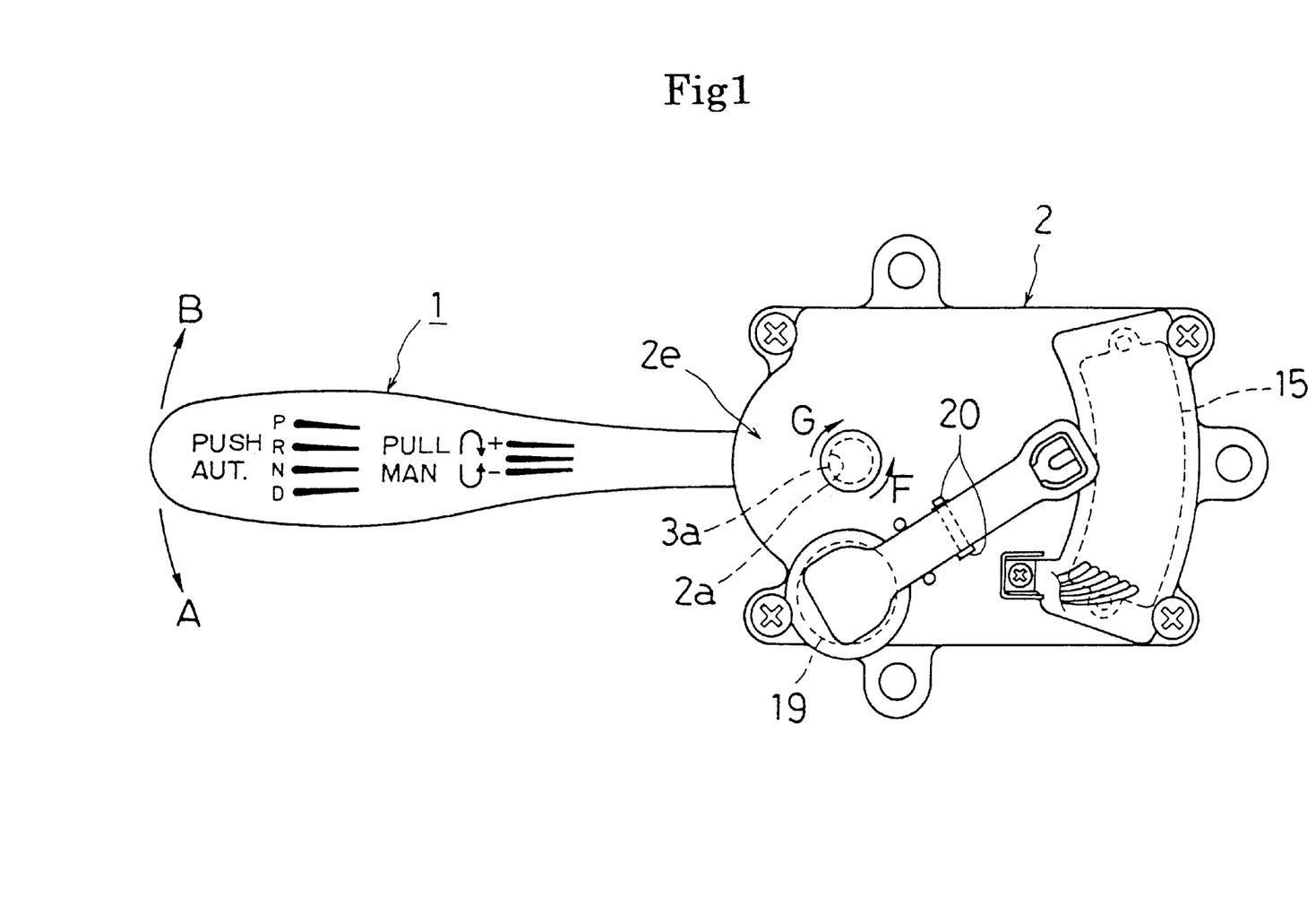
FIG. 1 is a plan view of an operation apparatus according to a first embodiment of the present invention.
Figure 2:
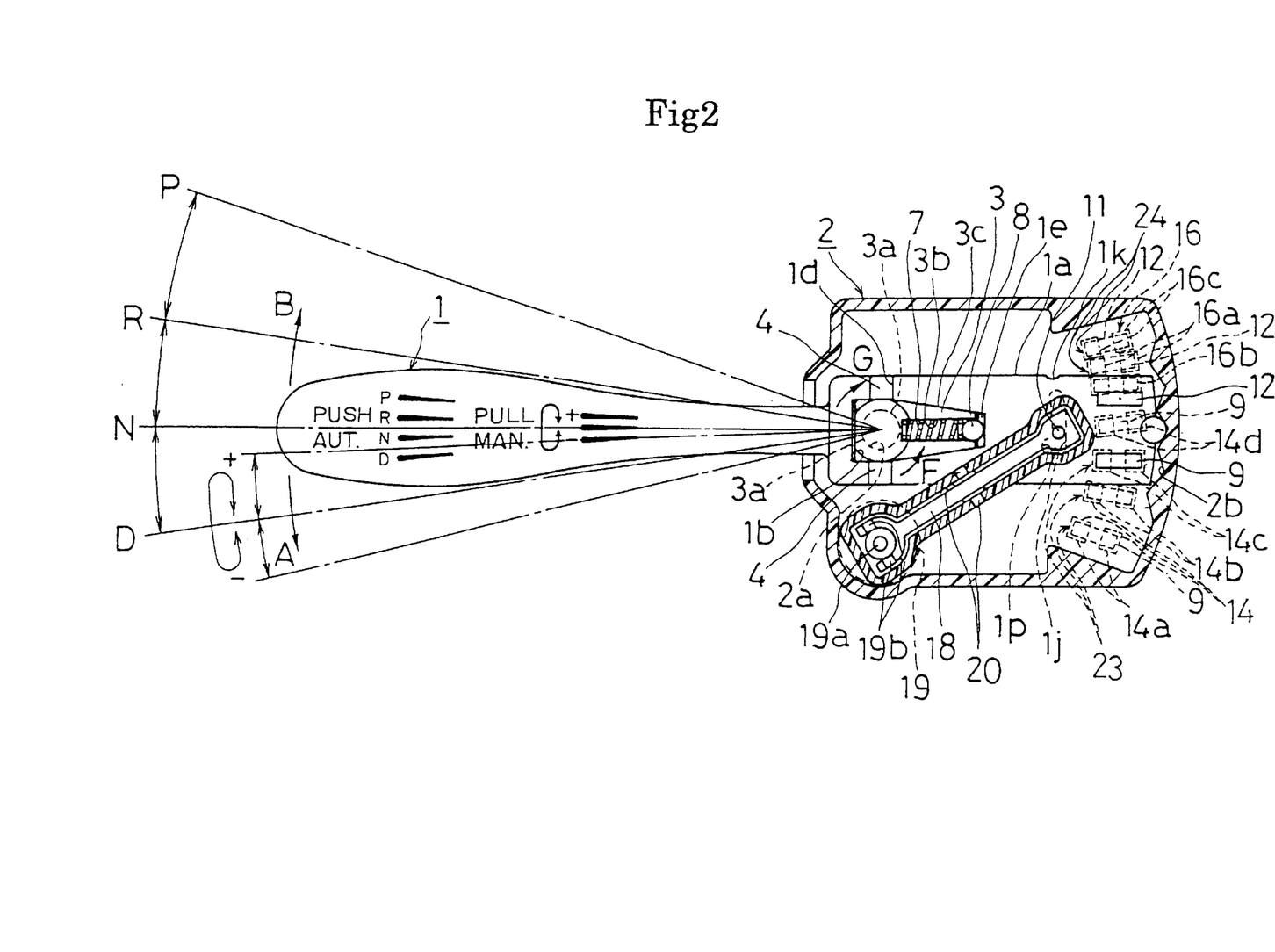
FIG. 2 is a lateral sectional view of a main portion of the first embodiment of the present invention.

A shift lever 1 is provided for selecting a desired driving position out of a plurality of driving positions, such as run, park and the like, in vehicles such as automobiles of the A/T (Automatic Transmission) type. The shift lever 1 is mounted on a steering column. As shown in FIGS. 1 and 2, the shift lever 1 of the column type is supported swingably in the front-rear direction, as shown by the arrows A and B around the first shaft 3a of a movable body 3 within a case 2. Moreover, the shift lever 1 is supported swingably in the vertical direction, as shown by the arrows C and E around the second shaft 4 crossing with the first shaft 3a in FIGS. 3 and 4.

The shift lever 1 is provided with a through hole 1b extending in the vertical direction for disposing the movable body 3 at the center of a base end section 1a. The shift lever 1 is provided with a blind hole 1c for receiving a click spring 5 and a first click body 6 at the end surface of the base end section 1a. At the upper surface of the base end section 1a, there are provided a blind hole 1f and a contact slit 1j. The blind hole 1f is provided for receiving a first movable piece 9 and a contact spring 10 of the A/T switch 23 so as to allow movement of the first movable piece 9 along with the blind hole. The contact slit 1j is provided for allowing movement of the contact pin 11 in the contact-remove direction. With this structure, the base end section 1a functions as a detent plate.

At the lower surface of the base end section 1a, a blind hole 1h is formed for disposing a second movable piece 12 and a contact spring 13 of a manual switch 24 so as to allow the movement of the second movable piece 12 along the blind hole 1h. A contact projection 1i is also formed at the lower surface of the base end section to be contacted with an operation region limiting hole 2d at the bottom surface of the case 2 so as to allow the movement of the contact projection 1i in the contact-remove direction. Moreover, there are provided a shaft hole 1d into which a second shaft 4 is inserted so as to rotatably support the movable body 3, and a second click slit 1e to which a second click body 8 is pressed by the resilient force due to the click spring 7.

Figure 3:
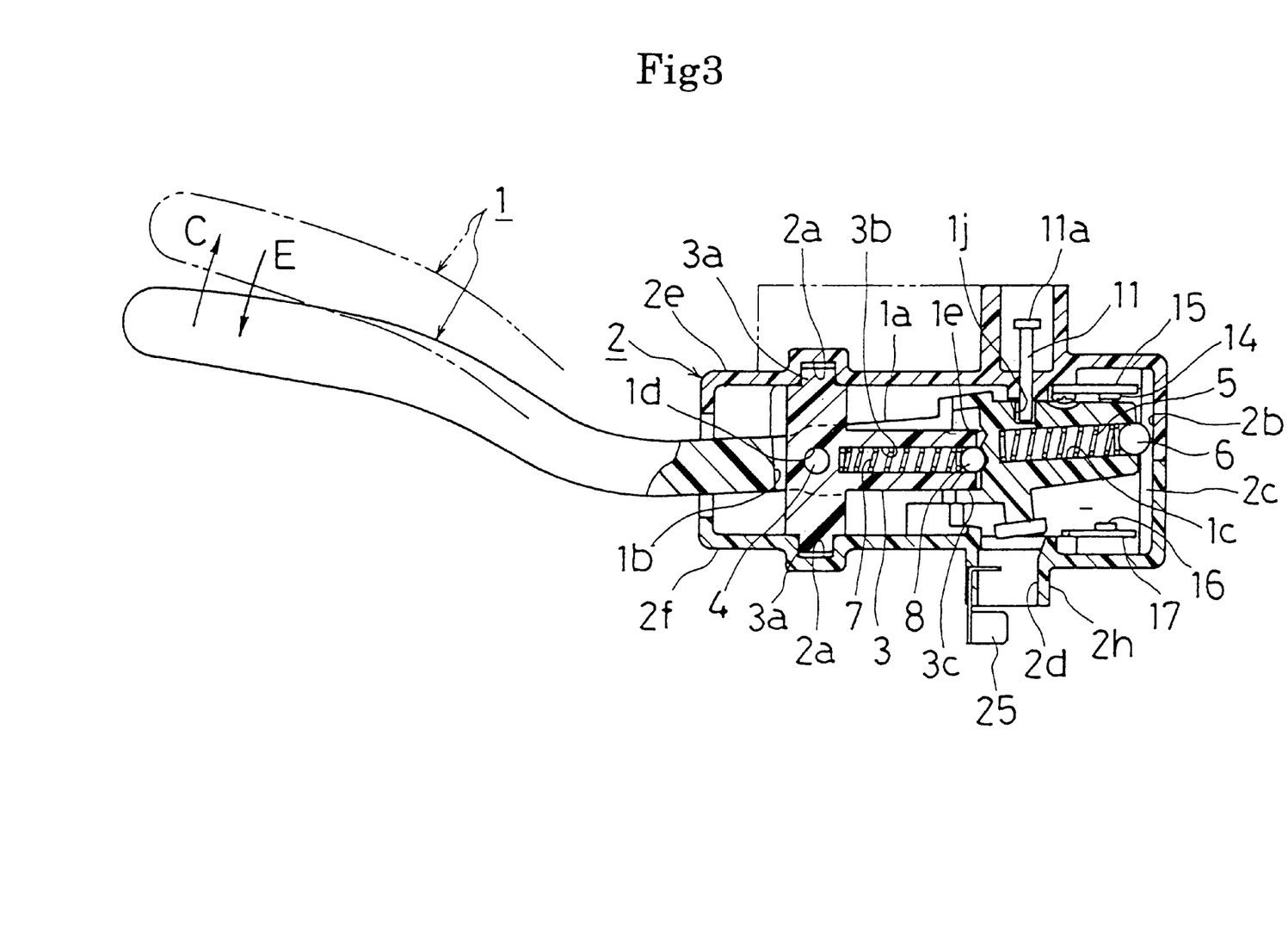
FIG. 3 is a longitudinal section view of a main portion of the first embodiment of the present invention.
Figure 4:
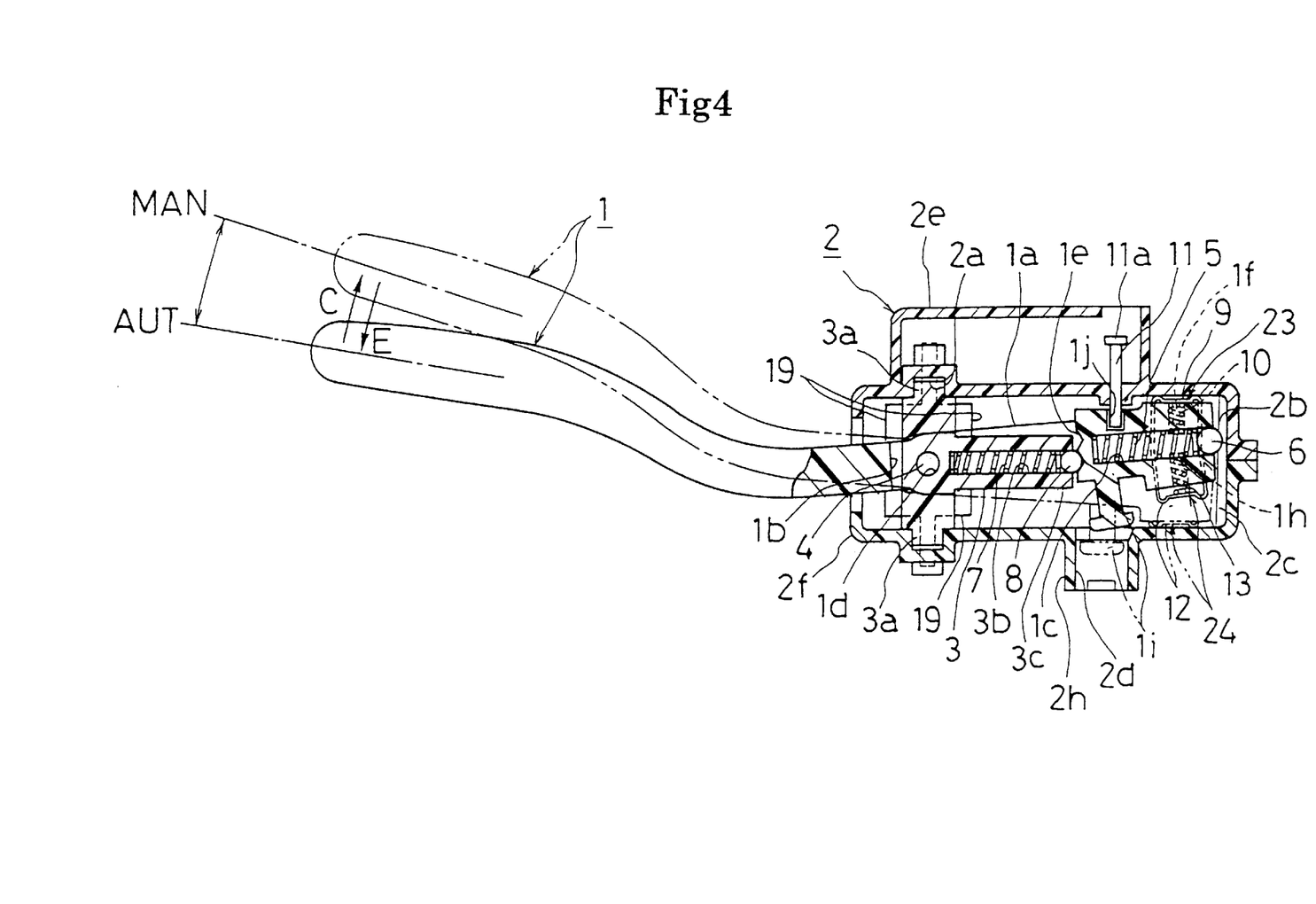
FIG. 4 is a longitudinal section view of a main portion of the first embodiment of the present invention similar to FIG. 3.
Figure 8:
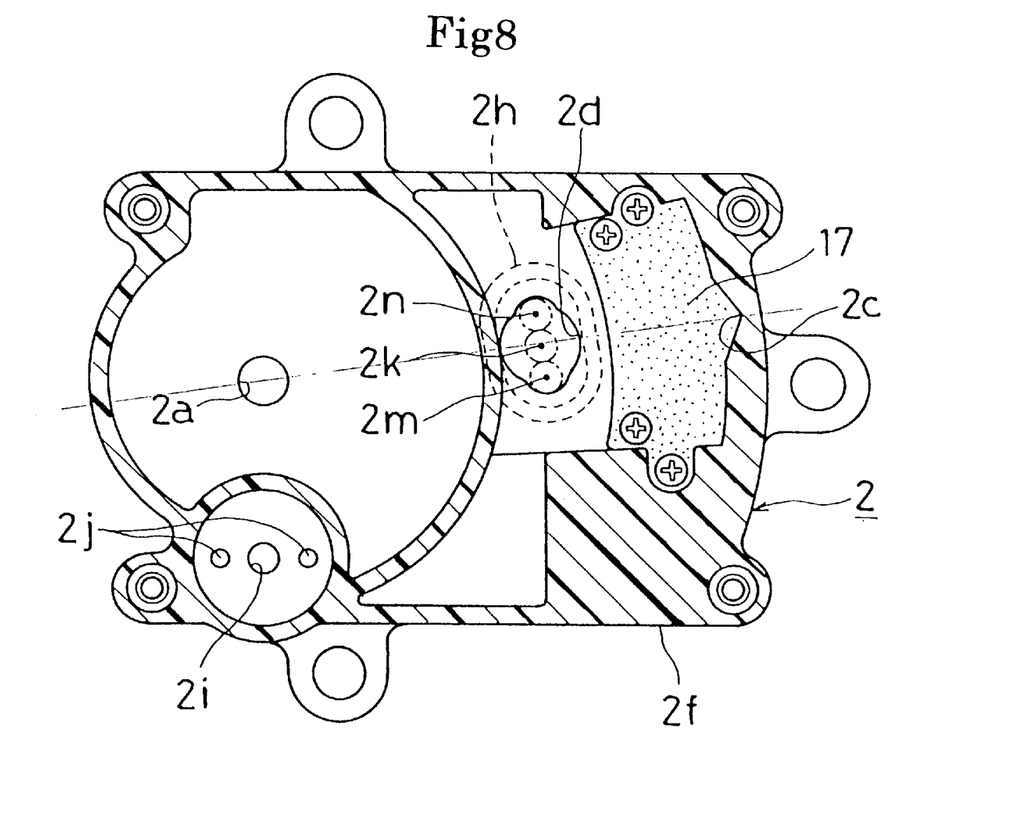
FIG. 8 is a lateral section view showing the lower case of the first embodiment of the present invention.

The case 2 is composed of an upper case 2e as an upper half and a lower case 2f as a lower half to be combined with the upper case 2e to form the case 2. The case 2 is screwed on a steering column at the lower side, for example, of a combination switch. As shown in FIGS. 3, 4 and 8, the operation range limiting hole 2d limits the swing operation range of the shift lever 1 in the front-rear direction, as shown by the arrows A and B, by contacting the contact projection 1i when the shift lever 1 is shifted to the manual (MAN) mode position. The operation range limiting hole 2d is shaped as an approximate arc.

Moreover, as shown in FIG. 8, the operation range limiting hole 2d is shaped as an approximate arc and has three positions, i.e., a neutral position 2k at which the shift lever 1 is supported on the MAN mode position, an acceleration change position 2m at which the transmission is changed up by one step when the shift lever 1 has swingably moved from the neutral position 2k in the plus direction, and a deceleration change position 2n at which the contact projection 1i contacts with the hole 2d when the shift lever 1 has swingably moved from the neutral position 2k in the minus direction.

As shown in FIGS. 3 and 4, at the lower peripheral portion of the operation range limiting hole 2d there is formed a cylindrical section 2h for protecting the contact projection 1i projected from the lower case 2f. Moreover, at the bottom surface of the lower case 2f, a supporting hole 2i is formed to support an actuator 19, and through holes 2j are formed at the position adjacent to the supporting hole 2i so as to pass screws for fixing the actuator 19.

The movable body 3 swingably moves only in the front-rear direction, as shown by the arrows F and G, because the first shaft 3a is movably supported by the shaft holes 2a and 2a on the upper case 2e and the lower case 2f, respectively. The shift lever 1 swingably rotates around the first shaft 3a together with the movable body 3 in the front-rear direction, as shown by the arrows A and B, because the first shaft 3a inserted into the through hole 1b is rotatably supported by the shaft holes 2a and 2a.

In the auto (AUT) mode position, the shift lever 1 is supported at each range position of P (Parking), R (Reverse), N (Neutral), and D (Drive) because the first click body 6 is clicked at each slit of the first click slit 2b formed at the inner wall of the upper case 2e and the lower case 2f. The shift lever 1 in the MAN mode position is supported to restore to the neutral position 2k automatically.

As shown in FIGS. 2 to 4, the movable body 3 is formed with the first shaft 3a disposed in the vertical direction, the second shaft 4 disposed to be crossing to the first shaft 3a in the left-right direction, and a cylindrical click body mounting section 3c provided with the blind hole 3b to be inserted with the click spring 7 and the second click body 8 in the extending direction of the shift lever 1. The second click body 8 is pressed with pressure to the second click slit 1e formed at the inner wall of the through hole 1b to thereby support the shift lever 1 at two positions of MAN (Manual operation position) and AUT (Auto operation position). The shift lever 1 is swingable around the second shaft 4 in the vertical direction, as shown by the arrows C and E.

Figure 7:
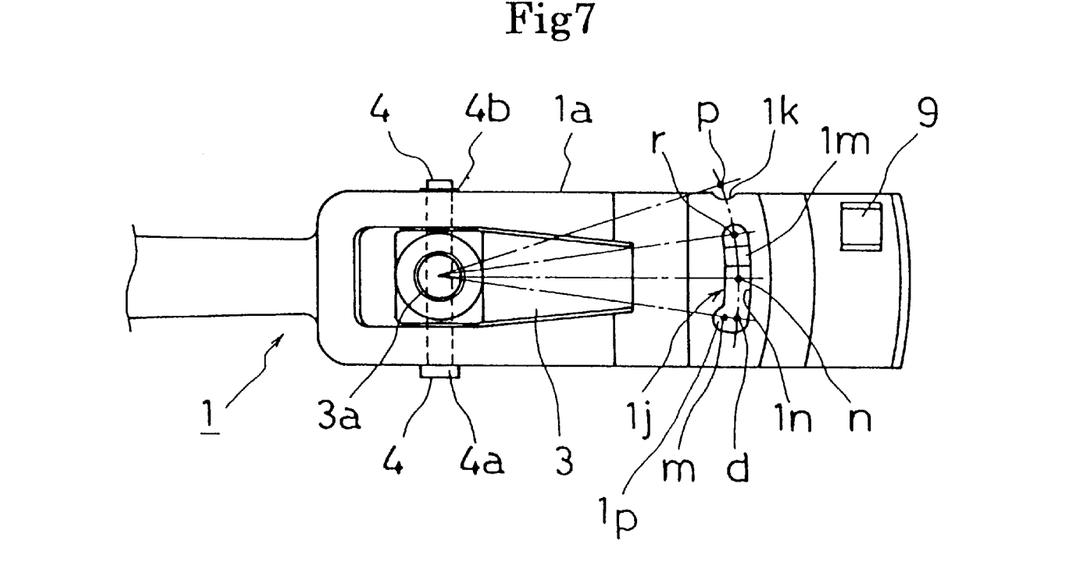
FIG. 7 is an enlarged plan view showing the base end section of the shift lever of the first embodiment of the present invention.

The second shaft 4 is made of metallic material and shaped in a pin formation having a head section 4a, as shown in FIG. 7. One end of the second shaft 4 is fixed by using a stopping ring 4b after the second shaft 4 is passed through the shift lever 1 and the movable body 3, thereby supporting the shift lever 1 and the movable body 3 swingably. Moreover, the second shaft 4 has only to be a shaft which is capable of rotatably supporting the movable body 3 on the shift lever 1. Therefore, the second shaft 4 may be a shaft rod or projections projected from the movable body 3 and integrally made with the movable body 3 in a body.

As shown in FIGS. 3 and 4, the first click body 6 supports the shift lever 1 at each range by being pressed with pressure to the first click slit 2b when the shift lever 1 is operated to the AUT mode position. Moreover, the first click body 6 automatically restores the shift lever 1 from the plus position and the minus position to the neutral position 2k by being pressed with pressure to the second click slit 2c when the shift lever 1 is shifted to the MAN mode position. The first click slit 2b is composed of a group of click slits formed in the inner wall of the upper case 2e composing the upper half of the case 2. In turn, the second click slit 2c is formed at the inner wall of the lower case 2f composing the lower half of the case 2.

The first movable pieces 9 compose the A/T switch 23 to be operated by being contacted with the fixed contacts 14 when the shift lever 1 is located at the AUT mode position. Further, the fixed contacts 14 are composed of the fixed contacts 14a, 14b, 14c, and 14d mounted on a first substrate 15 screwed on the upper and inner surface of the upper case 2e.

As shown in FIG. 2, the first movable pieces 9 are positioned at the fixed contacts 14a to make the contact therebetween when the shift lever 1 is located at the P range. Similarly, the first movable pieces 9 are positioned at the fixed contacts 14b to make the contact therebetween when the shift lever 1 is located at the R range. The first movable pieces 9 are positioned at the fixed contacts 14c to make the contact therebetween when the shift lever 1 is located at the N range. The first movable pieces 9 are positioned at the fixed contacts 14d to make the contact therebetween when the shift lever 1 is located at the D range. The above-mentioned A/T switch 23 is electrically connected to the automatic transmission.

The second movable pieces 12 compose a manual switch 24 operated by being contacted with the fixed contacts 16 of each range when the shift lever 1 is located at the MAN mode position. Further, the fixed contacts 16 are composed of the fixed contacts 16a, 16b, and 16c mounted on a second substrate 17 screwed on the bottom and inner surface of the lower case 2f. The second movable pieces 12, as shown in FIG. 2, contact the fixed contacts 16a when the shift lever 1 locates at the neutral position 2k in the MAN mode position.

The second movable pieces 12 contact the fixed contacts 16b when the shift lever 1 locates at the plus position in the MAN mode position. Further, the second movable pieces 12 contact the fixed contacts 16c when the shift lever 1 locates at the minus position in the MAN mode position. The manual switch 24 is electrically connected to the automatic transmission.

Figure 5:
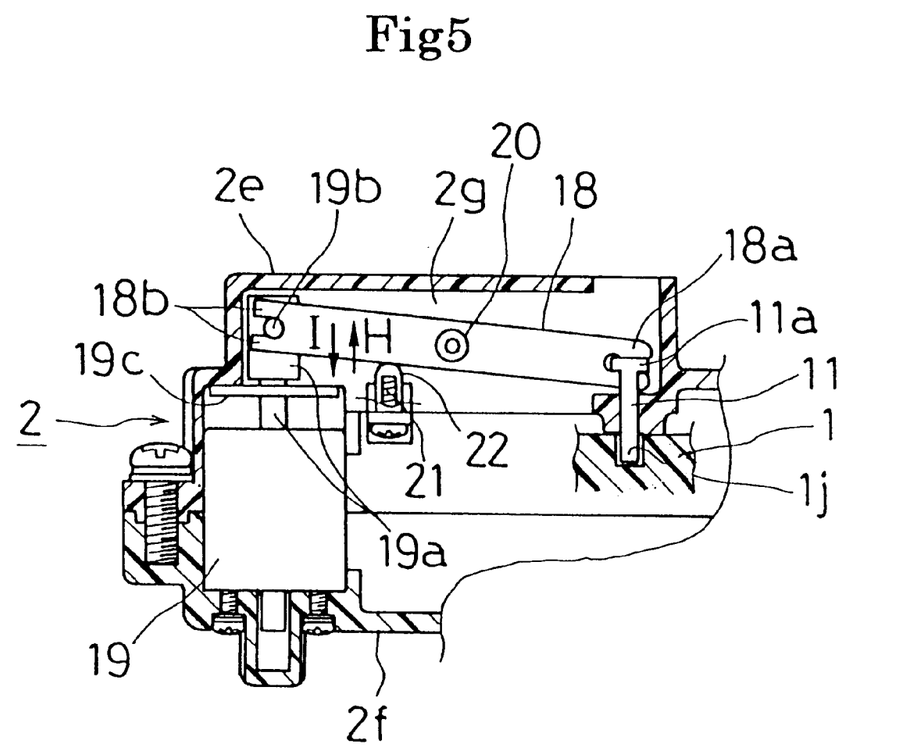
FIG. 5 is an enlarged sectional view showing a main portion of the first embodiment of the present invention.

The contact pin 11 limits the movement of the shift lever 1. The shift lever 1 becomes able to move to each of the driving positions by the fact that the contact pin 11 is removed from the contact slit 1j of the shift lever 1. As shown in FIG. 5, the head section 11a of the contact pin 11 is hooked at the interlock section 18a formed at the end of the link 18, thereby being moved in the vertical direction through the actuator 19. Moreover, the contact pin 11 may be composed of a plunger 19a of the actuator 19 without using the link 18 mentioned above.

Figure 6:
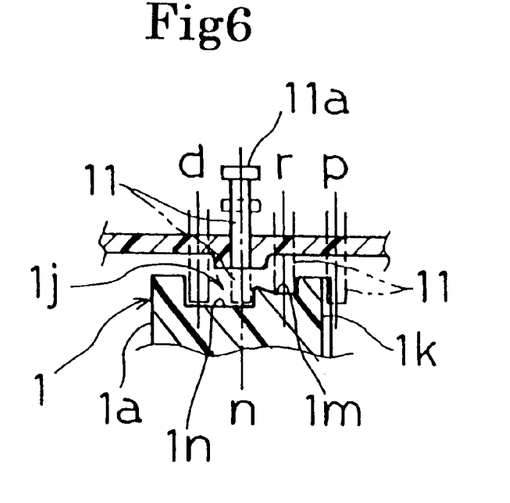
FIG. 6 is an enlarged sectional view showing a main portion of the first embodiment of the present invention.

As shown in FIGS. 6 and 7, the contact slit 1j is composed of three slits, i.e., a first slit 1m, a second slit 1n, and a third slit 1p. These three slits 1m, 1n, 1p are provided for limiting the swing movement of the shift lever 1 by a notch slit 1k and through the vertical contact of the end of the contact pin 11 vertically moving. The first and second slits 1m and 1n are respectively formed in an approximate arc shape and on the same arc with the center common to that of the first shaft 3a. The first slit 1m is provided for holding the shift lever 1 on the R range upon the contact with the contact pin 11. The second slit 1n is provided for supporting the shift lever 1 on the N range and the D range upon contact with the contact pin 11. Further, the third slit 1p is provided for movably supporting the shift lever 1 from the D range to the MAN mode position upon contact with the contact pin 11.

As shown in FIG. 6, when the shift lever 1 is on the P range, the lower end of the contact pin 11 is positioned at the P position at which the lower end of the contact pin 11 is contacted on the notch slit 1k. The notch slit 1k is a part of the contact slit 1j formed on the side wall of the shift lever 1. Therefore, the shift lever 1 is inhibited to move toward other ranges. When the shift lever 1 is in the R range, the lower end of the contact pin 11 is positioned at the r position of the contact slit 1j, thereby limiting the movement of the shift lever 1 toward other ranges.

When the shift lever 1 is in the N range, the lower end of the contact pin 11 is positioned at the n position of the contact slit 1j, thereby limiting the movement of the shift lever 1 toward any range except the D range. Similarly, when the shift lever 1 is in the D range, the lower end of the contact pin 11 is positioned at the d position of the contact slit 1j, thereby limiting the movement of the shift lever 1 toward any range desired positions to the transmission side. Therefore, the automatic transmission of an engine is controlled through the electric signals.

According to the structure of the lock mechanism in which the contact pin 11 contacts with the contact slit 1j of the shift lever 1, the actuator 19 is provided for removing the contact pin 11 for inhibiting the movement of the shift lever 1 from the contact slit 1j. The actuator 19 is composed of a solenoid or an electric motor actuated by electric signals from a key switch activated through the insertion of an ignition key, a stop lamp switch activated by depressing a brake pedal, a vehicle speed sensor activated when the vehicle's speed is below a predetermined value, and an engine rotation speed sensor activated when the engine's rotation speed is below a predetermined value. Upon actuation of the actuator 19 due to the electric signals, the contact pin 11 is removed due to the vertical movement of the link 18 from the contact slit 1j, thereby enabling the shifting operation of the shift lever 1 toward each position in the AUT mode position.

An example of the conditions for operating the actuator 19 is shown in the following Table:

| | Key Switch | Stop Lamp Switch | Vehicle Speed Sensor | Engine Rotation Speed Sensor |
|---|---|---|---|---|
| P | ● | ● | | |
| R | ● | ● | ● | |
| N | | ● | | ● |
| D | | | | |

This Table shows that if the shift lever 1 is in the P range, and the key switch and the stop lamp switch are in the ON state, respectively, the shift lever 1 can be moved to the R range by actuating the actuator 19 to remove the contact pin 11 from the notch slit 1k. Therefore, if the shift lever 1 is in the R range, the key switch and the stop lamp switch are in the ON state, respectively, and the vehicle's speed is detected as being below a predetermined value by the vehicle speed sensor, the shift lever 1 can be moved to the P range by the actuator 19 being actuated to remove the contact pin 11 from the r position of the contact slit 1j. Moreover, if the shift lever 1 is in the N range, the key switch and the stop lamp are in the OFF state, respectively, and the engine's rotation speed is detected as being below a predetermined value by the engine rotation speed sensor, the shift lever 1 can be moved to the R range by actuating the actuator 19 to remove the contact pin 11 from the n position of the contact slit 1j.

Since the shift lever 1 is structured, as shown in FIGS. 3 and 4, such that the shift lever 1 can perform a swingable movement around the second shaft 4 crossing to the first shaft 3a in the vertical direction, as shown by the arrows C and E, if the shift lever 1 is swingably moved from the D range of the AUT mode position upwardly in the direction shown by the arrow C, the shift lever 1 is converted into the MAN mode position, thereby enabling the manual operation. In the state that the shift lever 1 is swingably moved in the MAN mode position, it is possible to shift the shift lever 1 toward the plus direction or minus direction. At that time, the manual switch 24 is simultaneously operated, thereby converting the position into the plus direction or the minus direction sequentially.

For example, if the shift lever 1 is swingably moved from the neutral position of the MAN mode position to the plus direction, the automatic transmission is switched from a first speed stage to a second speed stage. Moreover, if the shift lever 1 is moved sequentially in the plus direction, the transmission is changed into a third speed stage, a fourth speed stage, and a fifth speed stage sequentially. Similarly, if the shift lever 1 is moved from the fifth speed stage sequentially in the minus direction, the transmission is changed into the fourth speed stage, the third speed stage, the second speed stage, and the first speed stage sequentially, thereby restoring the original transmission gear position.

Figure 9:
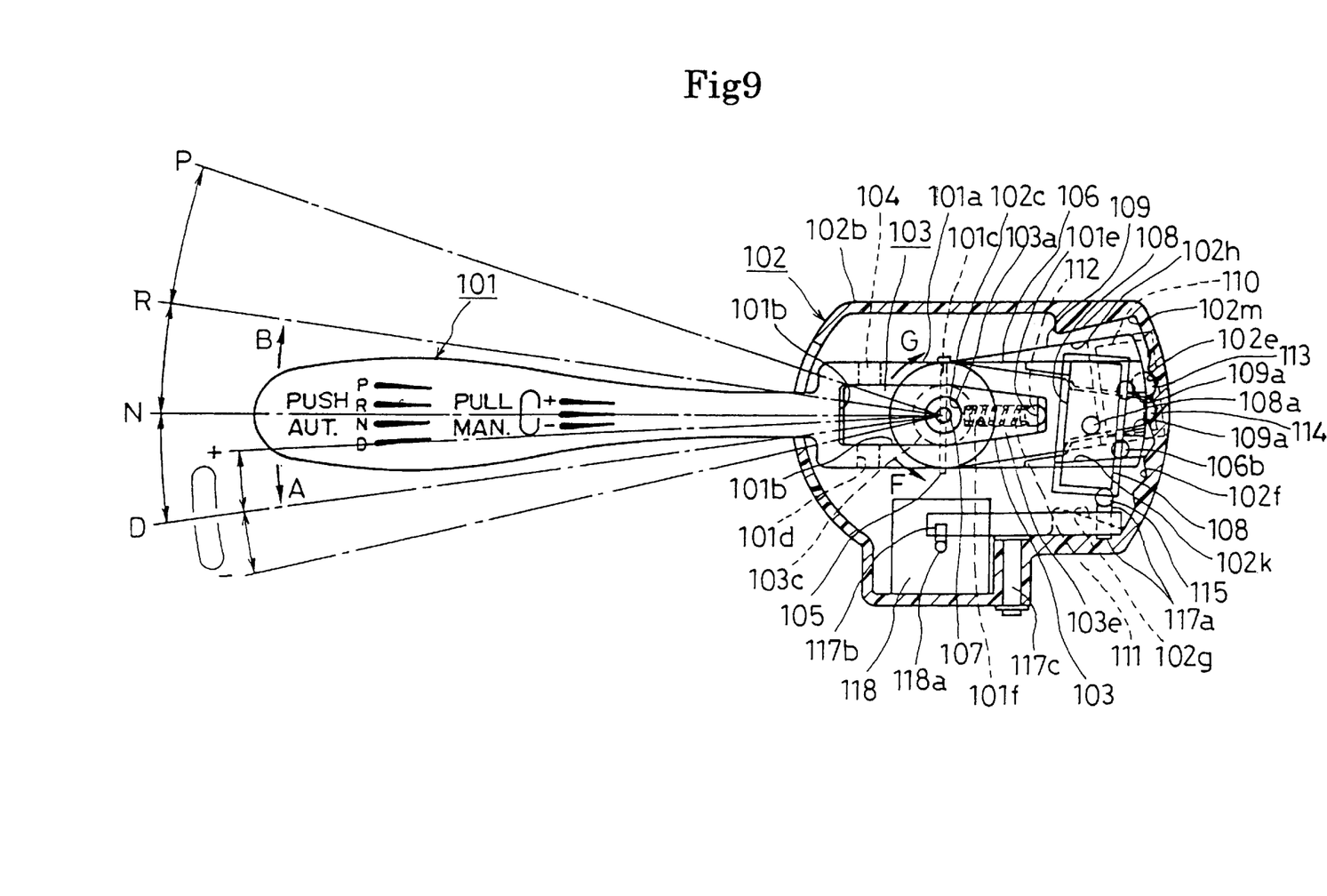
FIG. 9 is a plan view with a partial section of the operation apparatus according to a second embodiment of the present invention.
Figure 10:
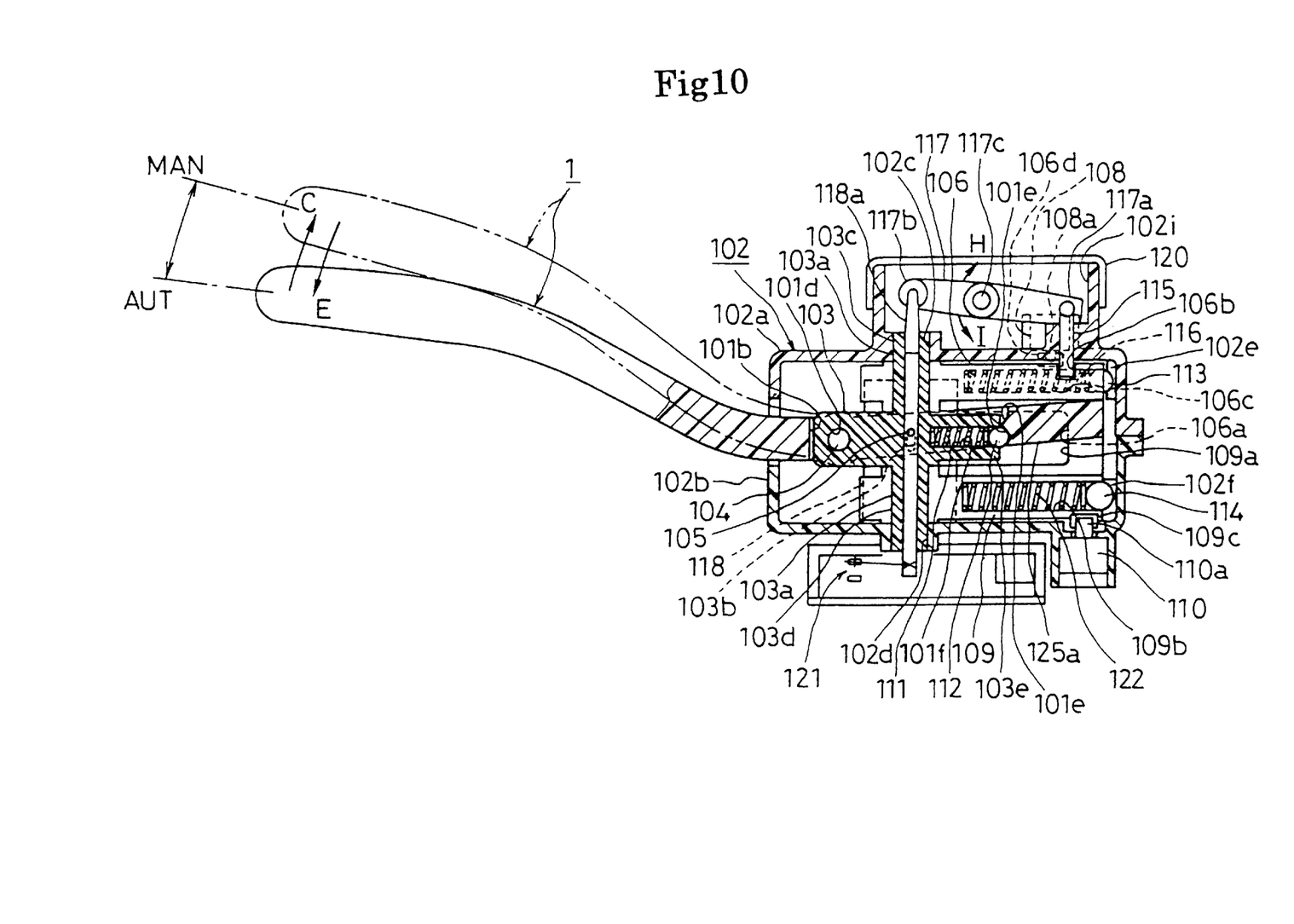
FIG. 10 is a longitudinal section view of a main portion of the second embodiment of the present invention.

Referring now to FIGS. 9 and 10, an operation apparatus according to a second embodiment of the present invention will be described in detail hereinafter.

A shift lever 101 for selecting a desired driving position out of plural driving positions, such as run, park and the like, is mounted on a steering column of vehicles, such as automobiles of the A/T type. The shift lever 101 of the column type is supported swingably in the front-rear direction, as shown by the arrows A and B, around the first shaft 103a of a movable body 103 within a case 102. Moreover, the shift lever 101 is supported swingably in the vertical direction, as shown by the arrows C and E around the second shaft 104 crossing with the first shaft 103a.

The shift lever 101 is provided with a through hole 101b extending in the vertical direction for disposing the movable body 103 at the center of a base end section 101a. The shift lever 101 has a first shaft hole 101c, a second shaft hole 101d, and a first click slit 101e within the through hole 101b. The first shaft hole 101c is the hole to be inserted with a shaft pin 105 for rotatably supporting the first shaft 103a on the shift lever 101.

The second shaft hole 101d is the hole to be inserted with the second shaft 104 for supporting the shift lever 101. The first click slit 101e is the slit to be pressed with pressure by a first click body 112 urged by a click spring 111, thereby supporting the shift lever 101 on the AUT mode position and the MAN mode position. The shaft pin 105 mounted in the first shaft hole 101c is inserted so as to be movable in the vertical direction within a longitudinal hole 103b formed at the center of a movable body 103. The shaft pin 105 interlocks the first shaft 103a disposed in the vertical direction and the shaft rod 107 inserted into the first shaft 103a.

A base end section 101a of the shift lever 101 operates an A/T switch 108 by being contacted with an operation section 106a of a first movable plate 106 disposed at the upper side thereof when the shift lever 101 is on the AUT mode position. The A/T switch 108 contacts with the fixed contacts of each range when the shift lever 101 is in the AUT mode position to perform its operation. The base end section 101a operates the manual switch 110 by being contacted with an operation section 109a of the second movable plate 109 disposed at the lower side when the shift lever 101 is in the MAN mode position.

The case 102 is composed of an upper case 102a as an upper half and a lower case 102b as a lower half. The case 102 is screwed on a steering column at the lower side of a combination switch. The upper case 102a forms a shaft hole 102c rotatably supporting the first shaft 103a and the stoppers 102g and 102h for limiting the swingable range when the shift lever 101 is in the AUT mode position. The stoppers 102g and 102h are formed on both of the inner walls of the upper case 102a for limiting the swingable range of the shift lever 101 in the direction shown by the arrows A and B. The base end section 101a strikes the stoppers 102g and 102h when the shift lever 101 is in the AUT mode position.

A lower case 102b forms a shaft hole 102d rotatably supporting the first shaft 103a and stoppers 102k and 102m for limiting the swingable range of the shift lever 101 when the shift lever 101 is in the MAN mode position. The stoppers 102k and 102m are formed on both of the inner walls of the lower case 102b for limiting the swingable range of the shift lever 101 in the direction shown by the arrows A and B. The base end section 101a strikes the stoppers 102k and 102m when the shift lever 101 is in the MAN mode position.

The movable body 103 swingably moves only in the front-rear direction as shown by the arrows F and G because the upper side 103c of the first shaft 103a is movably supported by the shaft hole 102c of the upper case 102a. Further, the lower side 103d of the first shaft 103a is movably supported by the shaft holes 102d of the lower case 102b. The shift lever 101 swingably rotates around the first shaft 103a together with the movable body 103 in the front-rear direction, as shown by the arrows A and B, because the first shaft 103a received into the through hole 101b is rotatably supported by the shaft holes 102c and 102d.

In the AUT mode position, the shift lever 101 is supported at each range position of P (Parking), R (Reverse), N (Neutral), and D (Drive) because the base end section 101a is contacted with the operation section 106a of the first movable plate 106. Further, the second click body 113 is contacted with the second click slit 102e formed on the inner wall of the upper case 102a. The shift lever 101 in the MAN mode position is supported so as to be restored from the plus position and the minus position to the neutral position automatically. The base end section 102a is contacted with the operation section 109a of the second movable plate 109, and the third click body 114 is contacted with the third click slit 102f formed on the inner wall of the lower case 102b.

The movable body 103 is formed with the first shaft 103a disposed in the vertical direction, the second shaft 104 disposed to be crossing to the first shaft 103a in the left-right direction, and a cylindrical click body mounting section 103e provided with the blind hole 101f into which a click spring 111 is inserted and a first click body 112 in the extending direction of the shift lever 101. The first click body 112 is pressed with pressure to a first click slit 101e formed at the inner wall of the through hole 101b to thereby support the shift lever 101 at the two positions of MAN (Manual operation position) and AUT (Auto operation position). The shift lever 101 is swingable around the second shaft 104 in the vertical direction, as shown by the arrows C and E. The first shaft 103a of the movable body 103 rotatably supports the first movable plate 106 at the upper side 103c and the second movable plate 109 at the lower side 103d.

The first movable plate 106 has a contact section 106d at its upper surface for contacting a first operation rod 108a of the A/T switch 108, and a contact slit 106b disposed on the upper surface for being contacted with and removed from a contact pin 115. The first movable plate 106 also has a blind hole 106c mounted at the end surface of the first movable plate 106 for receiving a second click spring 116 and a second click body 113. The second click body 113 is adapted to be contacted with a second click slit 102e.

The operation section 106a is composed of two projection pieces contacting both sides of the base end section 101a of the shift lever 101 extended downwardly from the lower surface of the first movable plate 106. The contact slit 106b is the slit for limiting the swingable range of the shift lever 101. The lower end of the contact pin 115 contacts with the contact slit 106b, and the side surface of the first movable plate 106 contacts with the shift lever 101. The contact slit 106b is the slit for holding the shift lever 101 at the R range upon being contacted with the contact pin 115. The swingable operation range of the shift lever 101 in the front-rear direction, as shown by the arrows A and B, is limited by the base end section 101a contacting with the operation section 106a and the first movable plate 106 contacting with the stoppers 102g and 102h mounted on the inner wall of the upper case 102a.

The contact pin 115 limits the swingable movement of the shift lever 101. Further, the shift lever 101 can be moved to each of the driving positions by removing the contact pin 115 from the contact slit 106b of the first movable plate 106. The upper end of the contact pin 115 is coupled with an interlocking section 117a formed at one end of a link 117. The contact pin 115 can be moved in the vertical direction through a plunger 118a of an actuator 118.

The link 117 is disposed so as to be movable in the vertical direction, as shown by the arrows H and I, within a receiving space 102i projected over the upper surface of the upper case 102a. The link 117 is rotatably supported around the central shaft 117c, and the interlocking section 117a provided at the one end of the link 117 is hooked to the contact pin 115. The interlocking section 117b at the other end of the link 117 is coupled with the plunger 118a. The receiving space 102i is formed on the inner and upper surfaces of the upper case 102a and is covered with a cover member 120.

The actuator 118 is an electric device composed of a solenoid operated by electromagnetic force or an electric motor. The actuator 118 is used for the purpose of a shift rock by removing the contact pin 115 from the contact slit 106b of the first movable plate 106 through the link 117 on parking and the like. The actuator 118 is adapted to be operated by the electric signals from a key switch, a stop lamp switch, a vehicle speed sensor, an engine rotation speed sensor, and the like. Moreover, the actuator 118 is sandwiched between the upper case 102a and the lower case 102b, and fixed by using screws. The actuator 118 provides a switch 121 for detecting movement of the plunger 118a at the lower end of the plunger 118a.

The second movable plate 109 is mounted with a contact section 109c contacted with an operation rod 110a of the manual switch 110 on the lower surface. The second movable plate 109 also includes a blind hole 109b for receiving a click spring 122 and a third click body 114 at the end surface thereof. The operation section 109a is composed of two projection pieces projected from the upper surface of the second movable plate 109 for contacting both sides of the base end section 101a of the shift lever 101. The third click body 114 contacts with the third click slit 102f. The manual switch 110 is contacted with the fixed contacts of each range when the shift lever 101 is in the MAN mode position to perform its operation.

When the shift lever 101 is located in the MAN mode position, the base end section 101a contacts with the operation section 109a, and the second movable plate 109 strikes the stoppers 102k and 102m mounted on the inner wall of the lower case 102b. Therefore, the swingable operation range of the shift lever 101 in the front-rear direction, as shown by the arrows A and B, is limited.

The second embodiment of the present invention constructed as described above is operated as follows.

The operation apparatus of the automatic transmission according to the present invention operates when a driver selectively operates the shift lever 101 to each AUT mode position of P range, R range, N range, and D range. The A/T switch 108 is activated through the swing operation of the shift lever 101, thereby transmitting the electric signals corresponding to each of desired positions to the transmission side. Therefore, the automatic transmission of an engine is controlled through the electric signals.

The operation apparatus includes a lock mechanism in which the contact pin 115 contacts with the contact slit 106b of the first movable plate 106 contacted with the shift lever 101. The actuator 118 is provided for removing the contact pin 115 for inhibiting the movement of the shift lever 101 from the contact slit 106b. The actuator 118 is composed of a solenoid or an electric motor actuated by electric signals from a key switch, a stop lamp switch, a vehicle speed sensor, and an engine rotation speed sensor. Upon actuation of the actuator 118 due to the electric signals, the contact pin 115 is removed through the vertical movement of the link 117 from the contact slit 106b, thereby enabling the shifting operation of the shift lever 101 toward each position in the AUT mode position.

The shift lever 101 is structured such that the shift lever 101 can perform the swingable movement around the second shaft 104 crossing to the first shaft 103*a* in the vertical direction, as shown by the arrows C and E. If the shift lever 101 is swingably moved from the D range of the AUT mode position upwardly in the direction shown by the arrow C, the shift lever 101 is converted into the MAN mode position, thereby enabling the manual operation. In the state that the shift lever 101 is swingably moved in the MAN mode position; it is possible to shift the shift lever 101 toward the plus direction or the minus direction. At that time, the manual switch 110 is simultaneously operated, thereby converting the position into the plus direction or the minus direction sequentially.

The present invention is not limited to the structures disclosed in each of the embodiments mentioned above, nor to an operation apparatus for automatic transmissions of the column type. The present invention may be adapted for use with an operation apparatus for automatic transmissions of the floor type such that the formation of the shift lever 101 is made as the formation of the floor type.

The shift lever is provided with an A/T switch operated by the swing operation of the shift lever for transmitting electric signals corresponding to desirable driving positions to the transmission side. An actuator of the electrically driven type is provided for removing the contact pin for inhibiting the movement of the shift lever 1 from the contact slit of the detent plate. In the case where the operation apparatus for an automatic transmission structured as mentioned above is adapted to a shift lever for controlling a vehicle, such as an automobile of the A/T type, the following excellent effects are achieved.

(1) Since it is not necessary to use the conventional wire used for electrically connecting the shift lever position side at which the shift lever is disposed with the transmission position side, and further the electric signals corresponding to the desired driving positions are transmitted to the transmission side by the A/T switch to be operated by the swingable operation of the shift lever which is similar to the conventional one, it is possible to effectively avoid the problem that deviations in the transmission of swingable operation force due to the shift lever is undesirably generated between both position sides because of slack off and distortion of the wire. Furthermore, it is also not necessary to secure the space required for the wiring in both positions. Thus, it is possible to reduce the manufacturing cost by saving assembling wiring.

(2) Since there is used as a detent mechanism for the shift lever, for the purpose of removing the contact pin for inhibiting the movement of the shift lever from the contact slit of a detent plate, an actuator of the electrically actuated type adapted to be operated by the electric signals from a key switch, a stop lamp switch, a vehicle speed sensor, and an engine rotation speed sensor, it becomes possible to use the shift lever having a single shift knob, thereby easily enabling the detent for desired positions with reliability and more increasing facility, feeling property and reliability for the swingable operation of the shift lever.

(3) Furthermore, the running ranges of an automatic transmission are electrically controlled to be changed on the basis of the shifting operations due to a shift lever disposed on a steering column section. Also, the shift lever is composed in such a manner that a movable body mounted at a base end section is pivoted by a second shaft mounted within a through hole which is configured to allow the shift lever to be swingable, thereby allowing the shift lever to be swingable around the second shaft in the vertical direction and further to be swingable around a first shaft mounted on the movable body in the front-rear direction. Therefore, it becomes possible to swingably operate the shift lever of the column type in the AUT mode position and the MAN mode position in the front-rear direction, and further to add many functions in multiple directions to the shift lever.

(4) The shift lever is provided with an A/T switch mounted at the upper portion of the base end section for being operated when the shift lever is in an auto mode position, and a manual switch mounted at the lower portion of the base end section for being operated when the shift lever is in a manual mode position. Therefore, the conventional wire for connecting a shift lever position side provided with the shift lever and a transmission position side is not necessary, and the electric signals corresponding to the desired driving positions are transmitted toward the transmission side through the A/T switch or a manual switch to be operated by the swingable operation of the shift lever. Therefore, it becomes possible to effectively remove several problems due to slack and distortion of the wire. Further, the space at the periphery of the steering column required for receiving the wiring is not necessary, and the number of assembling parts and the assembling cost are reduced.

(5) The shift lever is provided with a first movable contact piece mounted on the upper surface of the base end section for being contacted with a fixed contact of the A/T switch in the auto mode position. The shift lever is also provided with a second movable contact piece mounted on the lower surface of the base end section for being contacted with a fixed contact of the manual switch in the manual mode position. Therefore, since the A/T switch operated by the swingable operation of the shift lever and the manual switch are disposed within the case, it becomes possible to minimize the entirety of the operation apparatus of the automatic transmission.

(6) The shift lever is provided with a contact slit mounted at the upper surface of the base end section for being contacted with a contact pin for inhibiting the movement of the shift lever in the auto mode position. Further, the contact pin is removed from the contact slit through the actuator of the electrically driven type. Therefore, the function of a detent plate is added to the shift lever without adding any other parts, and any wrong operation of the shift lever is effectively avoided.

(7) The actuator is coupled with the contact pin through a link mechanism composed of a link or the like. The link mechanism is provided between the actuator and the contact pin. The link is provided with an interlocking section coupled with the contact pin at one end of the link and above the contact slit of the shift lever. An interlocking section at the other end of the link is disposed above the actuator. Further, the link is disposed so as to be swingable within a receiving space provided in the inner, upper surface side of a case. Therefore, since the contact slit contacted with the contact pin composing so-called detent mechanism is formed on the shift lever, it becomes possible to reduce the number of assembling parts and man-hours for assembly and to minimize the entirety of the case.

(8) The contact pin supports the shift lever at each of the ranges in an auto mode position by contacting the contact pin with the contact slit mounted at the base end section of the shift lever and a notch slit formed on the side surface of the base end section. Therefore, it becomes possible to avoid any wrong operation due to the shift lever and to increase the safety of the operation.

(9) The notch slit supports the shift lever at the P range by contacting the contact pin. Further, the contact slit is formed with the r position for supporting the shift lever at the R range, the n position for supporting the shift lever at the N range, the d position for supporting the shift lever at the D range, and the m position for supporting the shift lever to be movable from the D range to a manual mode position. Therefore, it becomes possible to increase the safety of the operation by utilizing the contact slit and the notch slit formed on the shift lever without using any detent plate.

(10) The shift lever is formed with a contact projection formed on the lower surface of the base end section, which is adapted to be contacted with an operation range limiting hole when the shift lever has moved swingably to the manual mode position. Therefore, it becomes possible to avoid any wrong operation of the shift lever without increasing the number of parts for manufacturing.

(11) The operation range limiting hole has an approximate arc shape, one end of which corresponds to an acceleration change position at which the contact projection is located when the shift lever has swingably moved from the neutral position of the manual mode position in the plus direction, and the other end of which corresponds to a deceleration change position at which the contact projection is located when the shift lever has swingably moved from the neutral position of the manual mode position in the minus direction. Therefore, it becomes possible to limit the operation range of the shift lever without increasing the number of parts for manufacturing.

(12) The operation range limiting hole is composed of a continuously formed cylindrical section for protecting the contact projection projected from the lower peripheral portion of the case. Therefore, it becomes possible to avoid any damage due to any strike of the contact projection against external objects, and to avoid any wrong operation of the shift lever.

(13) The shift lever has a first click body disposed at the end of the shift lever, and the movable body has a second click body disposed at the end of the movable body pressed to a second click slit. The first click body is pressed with pressure to a first click slit for supporting the shift lever to each range when the shift lever is located on an auto mode position, and to a second click slit for automatically restoring the shift lever to the neutral position from a plus position and a minus position of the manual mode position when the shift lever is located on a manual mode position. Therefore, it becomes possible to support the shift lever at each range on the auto mode position and the manual mode position.

(14) The running ranges of an automatic transmission are electrically controlled to be changed on the basis of the shifting operations due to a shift lever disposed on a steering column section. The shift lever is composed in such a manner that a movable body mounted at a base end section is pivoted by a second shaft mounted within a through hole configured to allow the shift lever to be swingable. Thus, the shift lever is swingable around the second shaft in the vertical direction and around a first shaft mounted on the movable body in the front-rear direction. Further, the first shaft of the movable body pivotably supports a first movable plate having a contact section contacted with a first operation rod of an A/T switch, and a second movable plate having a contact section contacted with an operation rod of a manual switch. Therefore, it becomes possible to operate the shift lever of the column type swingably on the auto mode position and the manual mode position in the front-rear direction, and to add many functions in multiple directions to the shift lever.

(15) Furthermore, according to the operation apparatus of the present invention, the conventional wire for connecting a shift lever position side provided with the shift lever of the column type and a transmission position side is not necessary. Further, the electric signals corresponding to the desired driving positions are transmitted toward the transmission side. Therefore, it becomes possible to effectively remove several problems due to slack and distortion of the wire. Further, the space required for receiving the wiring between both positions is not necessary, and the number of assembling parts and the assembling cost is reduced.

(16) The first movable plate is formed with an operation section contacted when the shift lever has swingably moved to an auto mode position at the lower surface thereof. The second movable plate is formed with an operation section contacted when the shift lever has swingably moved to the manual mode position at the upper surface thereof. Therefore, it becomes possible to present an operation apparatus for an automatic transmission capable of operating the shift lever on two positions, i.e., the auto mode position and the manual mode position in the front-rear direction.

(17) The operation section is contacted with a stopper formed at the inner wall of a case when the shift lever has swingably moved on the auto mode position, thereby limiting the operation range of the shift lever. Therefore, it becomes possible to avoid any wrong operation of the shift lever by limiting the operation range of the shift lever in the auto mode position.

(18) The operation section is contacted with a stopper formed at the inner wall of the case when the shift lever has swingably moved in the manual mode position, thereby limiting the operation range of the shift lever. Therefore, it becomes possible to avoid any wrong operation of the shift lever by limiting the operation range of the shift lever on the manual mode position.

(19) The case is formed with a second notch slit and a third notch slit on the inner wall thereof, and the shift lever is formed with the first notch slit within the through hole. The movable body is provided with a first notch body pressed with pressure to the first notch slit at its end. The first movable plate is provided with a second notch body pressed with pressure to the second slit at its end. The second movable plate is provided with a third notch body pressed with pressure to the third notch slit at its end. Therefore, since the A/T switch operated by the swingable operation of the shift lever and the manual switch are disposed within the case, it becomes possible to minimize the entirety of the operation apparatus for an automatic transmission. Therefore, since the contact slit to be contacted with the contact pin composing the detent mechanism is formed on the first movable plate and the second movable plate disposed at the base end section of the shift lever, it becomes possible to maintain the safety of the operation of the shift lever by supporting the shift lever at each range without using any detent plate and to minimize the entirety of the case.

(20) The first notch body is pressed with pressure to the first notch slit for supporting the shift lever when the shift lever has swingably moved to the auto mode position and the manual mode position. The second notch body is pressed with pressure to the second notch slit for supporting the shift lever to each range when the shift lever has swingably moved to an auto mode position. Further, the third notch body is pressed with pressure to the third notch slit for automatically restoring the shift lever to a neutral position from a plus position or a minus position when the shift lever is located on a manual mode position. Therefore, the shift lever is supported in the auto mode position and the manual mode position.

(21) The shift lever is provided with a contact slit contacted with a contact pin for inhibiting the movement of the shift lever in an auto mode position at the upper surface of the first movable plate. Further, the contact pin may be removed from the contact slit by an actuator composed of a solenoid or an electric motor. Therefore, it becomes possible to operate the contact pin electrically, to eliminate any mechanical member such as wire to be provided between the shift lever and the automatic transmission, to reduce the number of assembling parts and man-hours for assembly, and to reduce the manufacturing cost.

(22) The actuator is composed of a plunger having one end coupled to a link and another end provided with a switch for interlocking the link. Therefore, it becomes possible to lock the shift lever through the contact pin when no electric current flows into the actuator.

(23) The contact pin is mounted on the first movable plate, and the shift lever is supported at a P range in the auto mode position of the shift lever by the fact that the shift lever contacts with the contact slit for supporting the shift lever at an R range and the side surface of the first movable plate. Therefore, it becomes possible to avoid any wrong function due to the shift lever, thereby increasing the safety of the operation of the shift lever.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An operation apparatus for use with an automatic transmission, comprising:
    a shift lever which can be moved to each of a plurality of driving positions by removing a contact pin for inhibiting movement of the shift lever from a contact slit provided on a detent plate;
    an A/T switch operably connected to said shift lever so as to be operated by a swing operation of said shift lever for transmitting electric signals corresponding to desirable driving positions to a transmission side; and
    an electrically driven actuator for removing said contact pin for inhibiting the movement of said shift lever from said contact slit of said detent plate.

2. An operation apparatus according to claim 1, wherein said actuator comprises a solenoid operated by electromagnetic force or an electric motor.

3. An operation apparatus according to claim 1, wherein said actuator comprises a link mechanism disposed between said actuator and said contact pin, one end of said link mechanism being coupled with said contact pin and another end thereof being coupled with said actuator, and a spring for resiliently urging said contact pin to said contact slit on said detent plate.

4. An operation apparatus according to claim 1, wherein said actuator is operated by electric signals from a key switch, a stop lamp switch, a vehicle speed sensor, and an engine rotation speed sensor.

5. An operation apparatus for use with an automatic transmission to electrically control running ranges of the automatic transmission, comprising:
    a shift lever disposed on a steering column section;
    a movable body mounted at a base end section of said shift lever, said movable body being pivoted by a second shaft mounted within a through hole which is configured to allow said shift lever to be swingable, thereby allowing said shift lever to be swingable around said second shaft in a vertical direction and to be swingable around a first shaft mounted on said movable body in a front-rear direction.

6. An operation apparatus according to claim 5, wherein said shift lever is provided with an A/T switch mounted at an upper portion of said base end section which is operated when said shift lever is in an auto mode position, and a manual switch mounted at a lower portion of said base end section which is operated when said shift lever is in a manual mode position.

7. An operation apparatus according to claim 6, wherein said shift lever is provided with a first movable contact piece mounted on an upper surface of said base end section for being contacted with a fixed contact of said A/T switch when said shift lever is in said auto mode position, and a second movable contact piece mounted on a lower surface of said base end section for being contacted with a fixed contact of said manual switch when said shift lever is in said manual mode position.

8. An operation apparatus according to claim 6, wherein said shift lever is provided with a contact slit at an upper surface of said base end section for contacting with a contact pin for inhibiting movement of said shift lever in said auto mode position, and said contact pin is removed from said contact slit through an electrically driven actuator.

9. An operation apparatus according to claim 8, wherein said actuator is coupled with said contact pin through a link mechanism comprising a link, said link mechanism being provided between said actuator and said contact pin, said link being provided with an interlocking section coupled with said contact pin at one end of said link and above the contact slit of said shift lever, and an interlocking section at another end of said link is disposed above said actuator, and further said link is disposed so as to be swingable within a receiving space provided in the inner, upper surface side of a case.

10. An operation apparatus according to claim 8, wherein said contact pin supports said shift lever at each of a plurality of ranges in an auto mode position by contacting said contact pin with said contact slit mounted at said base end section of said shift lever and a notch slit formed on a side surface of said base end section.

11. An operation apparatus according to claim 10, wherein said notch slit supports said shift lever at a P range by contacting said contact pin, and further said contact slit is formed with an r position for supporting said shift lever at an R range, an n position for supporting said shift lever at an N range, a d position for supporting said shift lever at a D range, and an m position for supporting said shift lever to be movable from a D range to a manual mode position.

12. An operation apparatus according to claim 11, wherein said shift lever is formed with a contact projection formed on a lower surface of said base end section, said contact projection being adapted to be contacted with an operation range limiting hole when said shift lever has moved swingably to said manual mode position.

13. An operation apparatus according to claim 12, wherein said operation range limiting hole has an approximate arc shape, one end of which corresponds to an acceleration change position at which said contact projection is located when said shift lever has swingably moved from a neutral position of said manual mode position in a plus direction, and another end of which corresponds to a deceleration change position at which said contact projection is located when said shift lever has swingably moved from the neutral position of said manual mode position in a minus direction.

14. An operation apparatus according to claim 13, wherein said operation range limiting hole comprises a continuously formed cylindrical section for protecting said contact projection projected from a lower peripheral portion of said case.

15. An operation apparatus according to claim 8, wherein said shift lever has a first click body disposed at an end of said shift lever, said movable body has a second click body disposed at an end of said movable body to be pressed to a second click slit, and said first click body is pressed with pressure to a first click slit for supporting said shift lever to each range when said shift lever is located in an auto mode position, and a second click slit for automatically restoring said shift lever to said neutral position from a plus position and a minus position of said manual mode position when said shift lever is located on a manual mode position.

16. An operation apparatus according to claim 5, wherein said shift lever has a first click body disposed at an end of said shift lever, said movable body has a second click body disposed at an end of said movable body to be pressed to a second click slit, and said first click body is pressed with pressure to a first click slit for supporting said shift lever to each range when said shift lever is located in an auto mode position, and a second click slit for automatically restoring said shift lever to said neutral position from a plus position and a minus position of said manual mode position when said shift lever is located on a manual mode position.

17. An operation apparatus for an automatic transmission in which running ranges of an automatic transmission are electrically controlled to be changed on based on shifting operations of a shift lever disposed on a steering column section, comprising:

a movable body mounted at a base end section of the shift lever, said movable body being pivoted by a second shaft mounted within a through hole configured to allow said shift lever to be swingable around said second shaft in a vertical direction and around a first shaft mounted on said movable body in a front-rear direction; and said first shaft of said movable body pivotably supporting a first movable plate having a contact section contacted with a first operation rod of an A/T switch, and a second movable plate having a contact section contacted with an operation rod of a manual switch.

18. An operation apparatus according to claim 17, wherein said first movable plate is formed with an operation section contacted when said shift lever has swingably moved to an auto mode position at a lower surface thereof, and said second movable plate is formed with an operation section contacted when said shift lever has swingably moved to said manual mode position at an upper surface thereof.

19. An operation apparatus according to claim 18, wherein said operation section is contacted with a stopper formed at an inner wall of a case when said shift lever has swingably moved to said auto mode position, thereby limiting an operation range of said shift lever.

20. An operation apparatus according to claim 18, wherein said operation section is contacted with a stopper formed at an inner wall of said case when said shift lever has swingably moved in said manual mode position, thereby limiting an operation range of said shift lever.

21. An operation apparatus according to claim 17, wherein said case is formed with a second notch slit and a third notch slit on the inner wall thereof, said shift lever is formed with said first notch slit within said through hole, said movable body is provided with a first notch body pressed with pressure to said first notch slit at its end, said first movable plate is provided with a second notch body pressed with pressure to said second notch slit at its end, and said second movable plate is provided with a third notch body pressed with pressure to said third notch slit at its end.

22. An operation apparatus according to claim 21, wherein said first notch body is pressed with pressure to said first notch slit for supporting said shift lever when said shift lever has swingably moved to an auto mode position and a manual mode position, said second notch body is pressed with pressure to said second notch slit for supporting said shift lever to each range when said shift lever has swingably moved to said auto mode position, and said third notch body is pressed with pressure to said third notch slit for automatically restoring said shift lever to a neutral position from a plus position or a minus position when said shift lever is located in said manual mode position.

23. An operation apparatus according to claim 17, wherein said shift lever is provided with a contact slit contacted with a contact pin for inhibiting movement of said shift lever in an auto mode position at an upper surface of said first movable plate, and said contact pin is removable from said contact slit by an actuator comprising a solenoid or an electric motor.

24. An operation apparatus according to claim 23, wherein said actuator comprises a plunger having a first end coupled to a link and a second end provided with a switch for interlocking said link.

25. An operation apparatus according to claim 24, wherein said contact pin is mounted on said first movable plate, and said shift lever is supported at a P range in said auto mode position of said shift lever by said shift lever contacting with said contact slit for supporting said shift lever at an R range and a side surface of said first movable plate.

* * * * *